July 4, 1961

R. GRAVELEY 2,990,590

AWNING RAFTER SADDLE TIE

Filed July 31, 1958

INVENTOR.
ROBERT GRAVELEY
BY Cullen & Canton
Attorneys

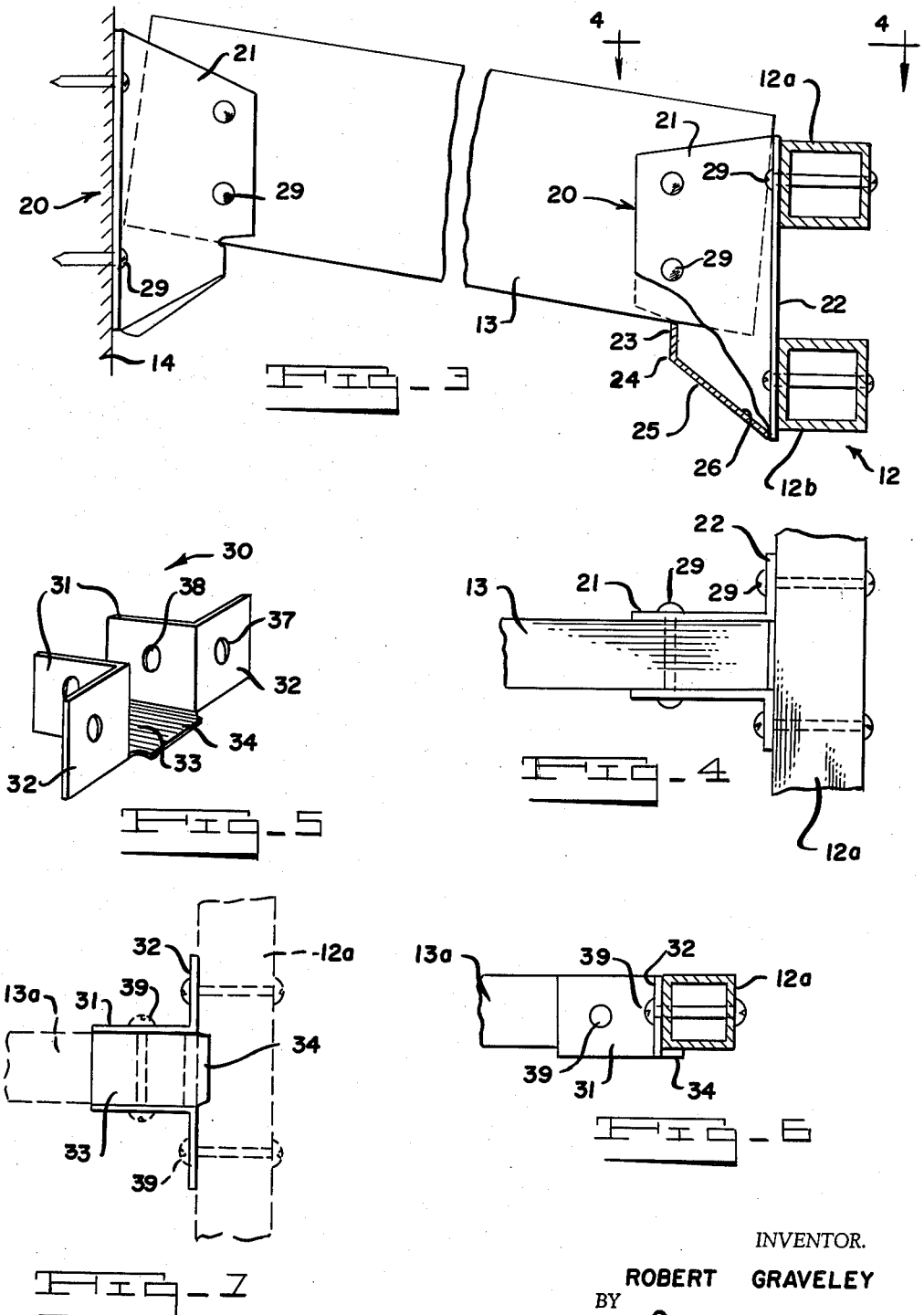

United States Patent Office 2,990,590
Patented July 4, 1961

2,990,590
AWNING RAFTER SADDLE TIE
Robert Graveley, Detroit, Mich., assignor to Lite Vent Industries, Inc., Detroit, Mich.
Filed July 31, 1958, Ser. No. 752,286
1 Claim. (Cl. 20—94)

This invention relates to an awning rafter saddle tie and more particularly to a device useful for connecting the ends of the roof rafters of an awning to its supports.

In the construction of a metallic type awning, a horizontal frame is arranged in front of a support wall and is connected to the support wall. Roof rafters interconnect the front of the horizontal frame to the wall support. The awning deck or cover rests upon the roof rafters. Because the awning roof frequently carries heavy loads, such as snow loads, high wind pressures, etc., the rafter ends are frequently broken free of the wall support or the horizontal frame and thus cause the awning to collapse.

Thus, it is an object of this invention to provide a roof rafter saddle tie of great strength and ability to resist high loads, and yet which is simple and inexpensive to manufacture and install.

A further object of this invention is to form a saddle tie which not only connects the roof rafter to the front horizontal rafter of the awning, but which is formed to serve as a brace or strut to rigidify the front horizontal rafter.

An additional object of this invention is to form a saddle tie so constructed that it strongly resists the turning couple, caused by roof loads, which tends to twist the ends of the roof rafters down relative to the front horizontal rafter, which means for resisting such is in the form of a simple, short, rigid tongue fitted against the bottom of the front rafter.

These and other objects and advantages of this invention will become apparent upon reading the following description of which the attached drawings form a part. With reference to the attached drawings, in which:

FIG. 3 is an enlarged side view of the roof rafter and the saddle ties connected to their supports, with one of the ties being shown in cross-section.

FIG. 4 is a top view taken in the direction of arrow 4—4 of FIG. 3.

FIG. 5 is a perspective view of a modified saddle tie.

FIGS. 6 and 7 show the saddle tie of FIG. 5 in elevation and plan view respectively and connecting a roof rafter to a front rafter.

Figure 1:
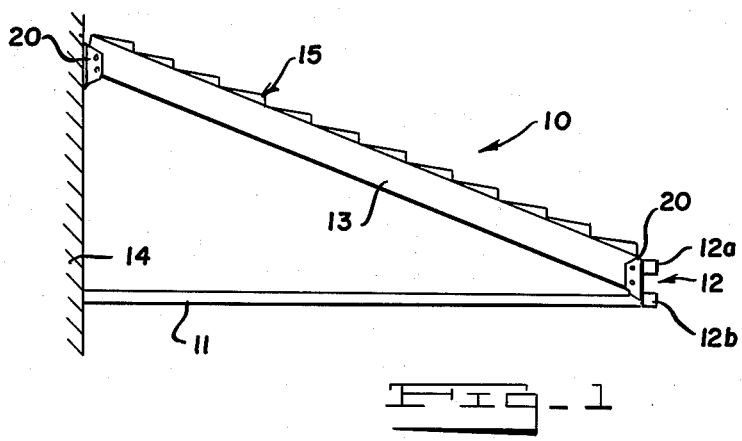
FIG. 1 is a side elevation view of a completed awning.

FIG. 1 shows a conventional awning 10. The awning is constructed out of a horizontal frame consisting of horizontal side rafters 11, each having one end connected to a wall 14 and the opposite end connected to a front horizontal rafter 12. Roof rafters 13 are connected at one end to the wall 14 and at the opposite end to the front horizontal rafter 12. The awning roof or deck 15 is laid on top of the roof rafters and secured thereto. In the illustration, the awning roof is shown as being of a stepped down, thin sheet metal construction.

Figure 2:
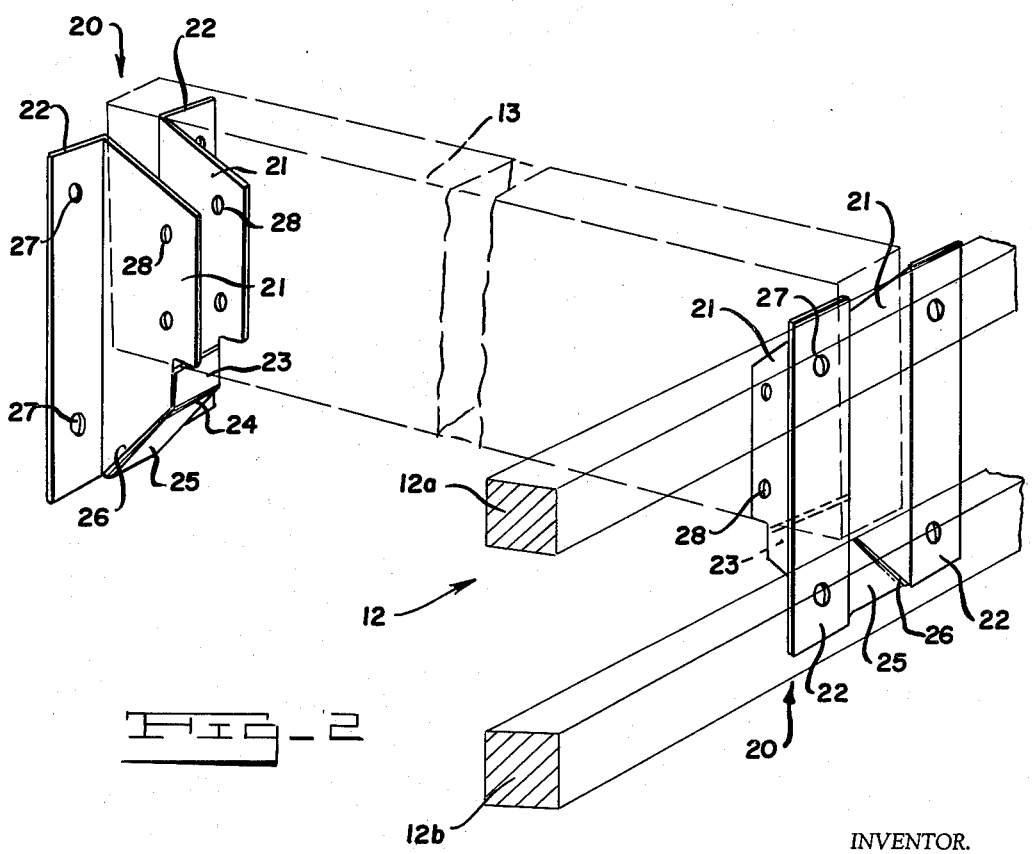
FIG. 2 is an enlarged perspective view of the saddle ties and shows the front and roof rafters in phantom lines.

With reference particularly to FIGS. 2 and 3, the saddle ties 20 are formed of a single sheet of flat, thin, rigid, sheet metal, such as thin gauge sheet steel, or the like. The flat sheet is bent to form two parallel spaced apart walls 21 which are normally arranged in a vertical plane and which are spaced apart a distance equal to the width of the roof rafter 13. One of the vertical edges of each of the two walls are bent into flanges 22, which flanges are coplanar, oppositely extending and arranged to abut in fact to face contact with either the wall 14 or the rafter 12.

The two walls 21 are interconnected by means of a cross tie 23 which is substantially vertical and interconnects the opposite vertical edges of the wall 21. The cross tie is bent at 24 and forms a bridge 25 between the beveled edges 26 forming the bottoms of the wall. The bridge is either integral with or connected to the beveled edges 26. However, where desired, its side edges may be left free of and merely adjacent to the beveled edges 26.

As seen in FIG. 2, the two saddle ties are identical in construction, with the flanges 22 of one of them being arranged in face to face contact with the wall surface 14 and the other arranged in face to face contact and bridging the two parallel rods 12a and 12b which form the front horizontal rafter 12. Ordinarily, where a front rafter is constructed out of two parallel rods, as it frequently is, the rods are interconnected by struts or the like. Here, the base flanges 22 interconnect the two rods 12a and 12b and thus eliminate the need for struts.

The roof rafter 13 is rested upon the horizontal edge of the top of cross tie 23 and suitable screws or bolts or the like 29 are inserted through openings 28 and through the roof rafter to connect the roof rafter to the walls 21. Likewise, similar fasteners 29 extend through openings 27 in the flanges 22 to connect the flanges to the support wall or front rafter, respectively. The ends of the rafter 13 are hidden from view. Thus, the ends of the rafter need not be carefully fitted against the rafter 12 and the wall 14, but may be cut approximately to size.

FIGS. 5 to 7, inclusive, illustrate a slightly modified form of saddle tie designed to secure a rafter 13a which is not as deep as the rafter 13. For example, the rafter 13a may be a one inch deep rafter, whereas rafter 13 may be a four inch deep rafter. Here, the saddle tie 30 is formed with two parallel walls 31, the walls being spaced apart and interconnected at their bottom edges by a cross tie 33. The wall vertical edges are also bent into flanges 32 which are coplanar and oppositely extending as shown in FIG. 5.

The rafter 13a fits between the two walls 31 and rests on the top of cross tie 33 and is connected thereto by means of screws or bolts or the like 39 extending through openings 38 in the walls. The flanges 32 are connected to the single rafter rod 12a by means of similar fasteners 39 passing through openings 37.

When the awning roof, which rests on top of and is secured to the roof rafter 13a, is fully loaded, the end of the rafter tends to slip down or twist counterclockwise relative to the front horizontal rafter 12a (see FIG. 6). To prevent the saddle tie from twisting or pivoting, and particularly from breaking the fastening means 39 which connect the flanges to the horizontal rafter, a short tongue 34, is provided. The tongue is integral with and extends forwardly of the cross-tie 33 a short distance beyond the flanges 32. As shown in FIG. 6, the tongue 34 rests against the bottom of the front horizontal rafter and acts as a stop means to prevent the saddle tie from pivoting or twisting relative to the horizontal rafter. This greatly rigidifies the structure and permits it to carry many times greater weight than it might otherwise be capable of carrying.

This invention may be further developed within the scope of the following attached claim. Accordingly, it is desired that the foregoing description be read as being merely illustrative of an operative embodiment of this invention and not in a strictly limiting sense.

I claim:

An awning rafter saddle tie for supporting an end of a rafter which is substantially rectangular in cross-section and which rafter is arranged at an angle to the horizontal, comprising a thin, flat, rigid metal sheet bent into two flat, parallel, normally vertically arranged walls having corresponding inner vertical edges and outer vertical edges, and inner flat, unobstructed wall surfaces facing each other, the walls being spaced apart a distance substantially equal to the width of the rafter to be supported for snugly receiving the rafter end between their inner surfaces with the two inner surfaces in face to face contact with the opposite sides of the rafter, the inner edges of the walls each being bent into flat, vertical flanges, the two flanges each being co-planar, oppositely extending and perpendicular to their respective walls for securing the saddle tie to a support wall by mechanically fastening the flanges to the support wall, the wall outer edges being interconnected by a cross-tie formed of a vertically arranged flat portion arranged at right angles to the walls and having a thin, horizontal top edge spaced a considerable distance beneath the upper ends of the walls and extending transversely between the walls and bridging the space between the walls for supporting the bottom of the rafter upon the thin edge which thus forms a support fulcrum, with the bottom of the rafter being otherwise unsupported by the saddle tie, said walls extending beneath the cross-tie a considerable distance, with the bottom portions of the outer edges of the walls beneath the cross-tie each being slanted downwardly and towards their respective inner edges and a bridge portion integral with the cross-tie bridging the space between the slanted bottom portions, whereby a rafter end may be inserted between and in contact with the walls and rested upon the top edge of the cross-tie and the rafter may be angularly adjusted in a plane parallel to the walls, and when adjusted, the rafter may be rigidly secured to the walls by mechanical fastening means.

References Cited in the file of this patent

UNITED STATES PATENTS

| | | |
|---|---|---|
| 243,966 | Pettit | July 5, 1881 |
| 517,186 | Goetz | Mar. 27, 1894 |
| 805,570 | Maldaner | Nov. 28, 1905 |
| 1,938,818 | Erickson | Dec. 12, 1933 |
| 2,701,397 | Taylor | Feb. 8, 1955 |

FOREIGN PATENTS

| | | |
|---|---|---|
| 422,765 | Great Britain | Jan. 17, 1935 |
| 554,327 | Great Britain | June 29, 1943 |